MYRON B. KRATZER
*INVENTOR.*

BY *Arthur McElroy*

*ATTORNEY*

June 22, 1954  M. B. KRATZER  2,681,924
METHOD FOR INCREASING YIELD OF WATER-SOLUBLE
CHEMICALS IN HYDROCARBON SYNTHESIS
Filed June 20, 1950  2 Sheets-Sheet 2

MYRON B. KRATZER
*INVENTOR.*

BY Arthur M cIlroy

*ATTORNEY*

Patented June 22, 1954

2,681,924

UNITED STATES PATENT OFFICE 2,681,924

METHOD FOR INCREASING YIELD OF WATER-SOLUBLE CHEMICALS IN HYDROCARBON SYNTHESIS

Myron B. Kratzer, Tulsa, Okla., assignor to Stanolind Oil and Gas Company, Tulsa, Okla., a corporation of Delaware Application June 20, 1950, Serial No. 169,172

8 Claims. (Cl. 260—449.6)

The present invention relates to the synthesis of valuable products from carbon monoxide and hydrogen. More particularly, it pertains to the provision of a combination of operating conditions whereby increased yields of oxygenated organic chemicals are obtained during concurrent production of gasoline hydrocarbons.

While the reduction of carbon monoxide with hydrogen has generally been employed for the purpose of producing hydrocarbons boiling principally in the gasoline range, the value of such a process would be considerably enhanced if it were susceptible of being made more flexible with respect to the nature of the products obtained so that substantially only economically attractive products were produced at prevailing market conditions. Accordingly, it is an object of my invention to provide an improved hydrocarbon synthesis process whereby the production of increased quantities of valuable water-soluble chemicals can be achieved. It is a further object of my invention to provide a method for effecting synthesis of gasoline hydrocarbons and water-soluble chemicals under a combination of operating conditions favorable to optimum yields of both hydrocarbons and chemicals.

It is known that liquid hydrocarbons as well as various oxygenated organic compounds can be synthesized by reducing carbon monoxide with hydrogen in the presence of a fluidized alkali-promoted iron catalyst at temperatures in the range of 550 to about 700° F. and at pressures in the neighborhood of 150 to 350 p. s. i. Prior workers in this field were confronted with many difficult problems in their effort to conduct this reaction in a manner such that maximum yields of desired products would be produced. In attempting to accomplish this object various combinations and ranges of conditions have been taught, however, the wide range of operating variables described in the prior art covers many conditions under which it is extremely uneconomical or undesirable to operate. In no single instance, of which I am aware, has any worker in this field provided a specific combination of conditions by which maximum yields of water-soluble oxygenated organic chemicals can be obtained.

In co-pending application U. S. Serial Number 163,863, filed May 24, 1950 by Richard Mungen and James E. Latta, conditions are defined by which optimum yields of $C_3$ and heavier hydrocarbon fractions are obtained. Briefly, such results are achieved by employing the following conditions: a fresh feed gas containing major proportions of hydrogen and carbon monoxide in a ratio of from about 1.5:1 to 2.0:1; temperatures of from about 600 to 670° F.; pressures of from about 325 to 425 p. s. i.; and a recycle of tail gases to the reactor in a ratio of from about 1.2 to about 1.7 volumes per volume of fresh feed. While the foregoing conditions result in total feed (T. F.) carbon monoxide conversions of from about 90 to about 95 per cent and in optimum yields of valuable $C_3$ and heavier hydrocarbons, the yield of water-soluble chemicals under such conditions is in the neighborhood of about 8 per cent. Utilization of the operating conditions listed above in hydrocarbon synthesis plants capable of producing 6,000 to 7,000 barrels per day of gasoline hydrocarbons yields a product water stream containing approximately 350,000 lbs. per day of water-soluble oxygenated organic chemicals.

In accordance with the process of my invention the quantity of water-soluble chemicals produced in such a synthesis can be increased, if desired, as much as from 42,000 lbs. to about 53,000 lbs. per day, i. e., an increase of from about 12 to about 15 per cent over the production of water-soluble chemicals normally expected. Basically, my invention involves the discovery that at total feed carbon monoxide conversions of the order of from about 70 to about 83 per cent, and preferably from about 75 to about 78 per cent, maximum yields of water-soluble chemicals are obtained. While it has been my observation that total feed carbon monoxide conversions in the range above stated should be maintained to achieve high selectivities to water-soluble chemicals, this result cannot be secured without simultaneously utilizing specific ranges of pressures, hydrogen to carbon monoxide fresh feed ratios, and recycle ratios. Thus, to procure the desired selectivity of total feed carbon monoxide to water-soluble chemicals, the following operating conditions should be employed: temperatures of from about 600 to about 670° F., preferably about 650° F.; pressures of from about 275 to about 400 p. s. i., preferably about 340 to 360 p. s. i.; a ratio of hydrogen to carbon monoxide in the fresh feed of from about 1.5 to about 2.0, preferably from about 1.7 to about 1.9, and a recycle of tail gas in a ratio of from about 1.2 to about 1.7 or 2.0 volumes per volume of fresh feed (F. F.). While it will, of course, be appreciated that the space velocity required for the procurement of total feed carbon monoxide conversions within the range desired varies with the type of reactor as well as with the type of catalyst employed, I have found that for a synthesis reactor having an internal diameter of 8 in. and a height of 20 ft. velocities of the order of 6.5 to about 12.5 S. C. F. H. CO (T. F.)/lb. of catalyst are generally satisfactory. With a given reactor, failure to employ the aforesaid combination of conditions within the ranges specified results in a lower selectivity to water-soluble organic chemicals. Thus, with recycle ratios less than 1.2:1 the selectivity to water-soluble chemicals falls off even though the other operating conditions are held within their respective preferred ranges. Although recycle ratios in excess of 1.7 to 2.0 may be used, the beneficial effect obtained by so doing is insignificant in comparison to the expenditure required for the auxiliary equipment necessary at such recycle rations. Also, I have found that it is important to carry out the synthesis at temperatures in the range of 600 to 670° F. I have made the further observation that within this temperature range, selectivity to water-soluble chemicals is relatively little effected at a given total feed carbon monoxide conversions level. At temperatures below 600° F. the reaction rate diminishes and fluidization problems frequently occur, while at temperatures in excess of about 670° F. the activity of the catalyst decreases rapidly. Thus, for example, in a run in which a temperature of 680° F. was employed, total feed carbon monoxide conversion declined from a high of 87 per cent to 70 per cent, while in a second run in which all conditions were identical with those employed in the first instance with the exception of temperature which was 650° F., total feed carbon monoxide conversions decreased from 87 per cent to only 77 per cent over the same period of time.

One of the most important features of my invention resides in the fact that conversion levels in the range previously specified should be achieved in order to obtain optimum yields of water-soluble chemicals. The relationship of space velocity to water-soluble chemicals product is only secondary. Thus, if the total feed carbon monoxide conversion is changed without a corresponding change in space velocity, e. g., by changing the reactor design, the selectivity and yield of water-soluble chemicals will vary with conversion and not with space velocity. Accordingly, at the desired total feed carbon monoxide conversion, i. e., from about 75 to about 78 per cent, maximum yields of water-soluble chemicals can be obtained while the space velocity employed to secure such results may vary with the reactor, the catalyst, or with other factors of secondary importance.

Although a preferred embodiment of my invention consists chiefly in the provision of a particular combination of operating conditions for hydrocarbon synthesis whereby it is rendered possible to secure a 12 to 15 per cent increase in the production of water-soluble chemicals over the yields normally obtained, the process of my invention can also be operated in a manner such that optimum conditions are provided for the production of both water-soluble chemicals and gasoline hydrocarbons. Thus, this object can be accomplished by effecting the synthesis in two stages, the first stage, or reactor, employing the conditions taught herein to produce optimum yields of water-soluble chemicals, while the second reactor is operated at a temperature of from about 600 to about 670° F. and at a pressure of from about 275 to about 400 p. s. i. The space velocity employed in this second reactor is such that the overall carbon monoxide conversion in the total feed to the first reactor is in the range of 90 to 95 per cent. If desired, fresh feed may be introduced into the second reactor along with tail gas from the first so that a synthesis gas having a desirable hydrogen to carbon monoxide ratio is utilized giving 90 to 95 per cent carbon monoxide conversions, based on the total feed to the second reactor.

It will be noted that the operating conditions herein set forth, and which I regard as critical in so far as concerns optimum selectivity of total feed carbon monoxide to water-soluble chemicals, apply in general to iron-type hydrocarbon synthesis catalysts. However, I have noted these conditions to be particularly suited to the procurement of substantially increased yields of water-soluble chemicals when employing the catalyst commonly designated as mill scale described and claimed in U. S. Patent No. 2,485,945 granted October 29, 1949, to S. W. Walker. This catalyst is prepared from the oxide scale or layer obtained by rolling iron or various alloys thereof at elevated temperatures, for example, in the range of 1,000 to 1,300° C. Microscopic examination of the scale or oxide layer thus obtained when ground to a fineness of the order of 325 mesh indicates that it still retains its characteristic plate-like structure.

My invention will be more clearly understood from the accompanying graphs, the curves of which are based on actual synthesis runs employing mill scale catalyst. Such graphs further demonstrate the important and close relationships existing between total feed carbon monoxide conversion, as well as other operating conditions, and the optimum selectivity to water-soluble chemicals.

Figure 4:
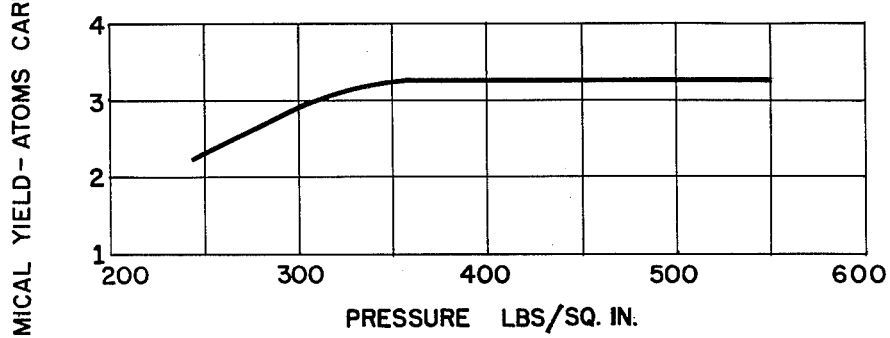

Figure 4 graphically illustrates the effect of pressure on water-soluble chemicals yield at a fixed conversion and at a constant recycle.

Figure 5:
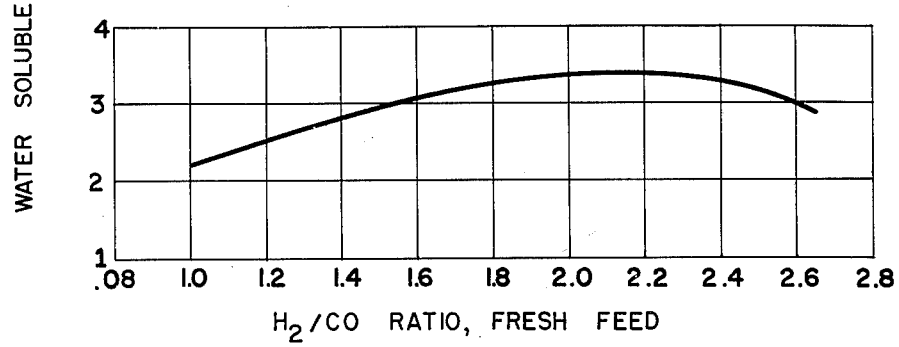

Figure 5 demonstrates the effect of $H_2:CO$ ratio on water-soluble chemicals yield at a fixed conversion and at a constant recycle.

The mill scale catalyst employed in the runs on which the above-mentioned graphs are based was promoted with from about 0.5 to about 0.7 per cent $K_2O$ based on the weight of the iron. Other alkali promoters may be employed although potassium compounds are generally preferred. In all cases the mill scale was ground to a screen size of about 100 mesh and promoted with potassium carbonate in the usual fashion. The promoted base material was then reduced with hydrogen at 700° F. and 250 p. s. i. until evolution of water could no longer be detected after which the catalyst was subjected to an activation period of twenty hours under the following conditions:

Fresh feed H₂:CO ratio _____ 1.85–1.9
Pressure, p. s. i. _____ 400
Recycle to fresh feed ratio _____ 1.8
Temperature _____ ° F __ 650
Space velocity S. C. F. H. CO (F. F.)/lb.
  of iron catalyst _____ 4.0–6.0

These conditions are essentially those of synthesis except that the recycle ratio is higher than that normally employed. Linear velocity is not critical, fluidization being maintained at velocities as low as 0.25 ft. per second; however, heat transfer is improved at higher velocities. Some catalyst carry-over depending, of course, on catalyst mesh size is experienced at 0.75 ft. per second, but any velocity may be used which is compatible with adequate fluidization and reasonable catalyst recovery by a cyclone or equivalent system.

Figure 1:
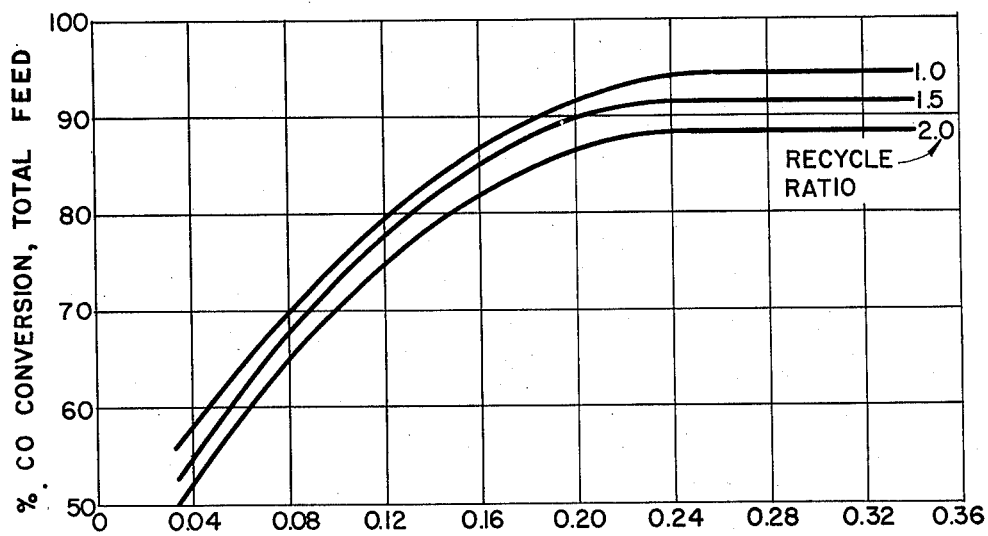
Fig. 1 is a graphic representation of the effect of recycle ratio and space velocity on total feed carbon monoxide conversion.
Figure 2:
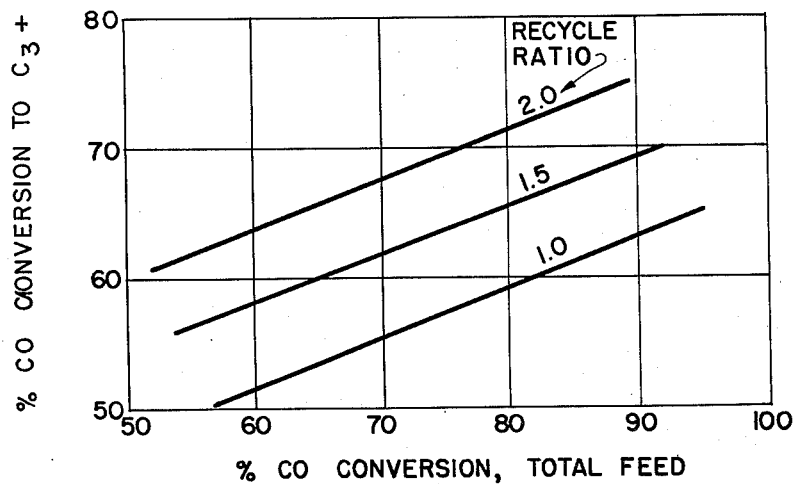
Fig. 2 is a graph illustrating the effect of recycle ratio on per cent total feed carbon monoxide conversion to $C_3$ and heavier hydrocarbons and the per cent conversion to such a fraction which might be expected when operating in the total feed carbon monoxide conversion range taught herein for optimum selectivity to water-soluble chemicals.

In the runs on which the curves in Fig. 1 are based the following conditions were established:

Fresh feed H₂:CO ratio _____ 1.85
Pressure, p. s. i. _____ 400
Recycle ratio _____ 1 to 2
Space velocity _____ 2.5 to 11.1

From the curves in Fig. 1 it will be seen that the total feed conversion is lower at the higher recycle ratio. Fresh feed conversion, however, is slightly higher. In the desired total feed carbon monoxide conversion range, i. e., 70 to 80 per cent, it will be observed that for the particular reactor and catalyst employed space velocities of from about 6.5 to about 12.5 S. C. F. H. CO/lb. of catalyst were satisfactory. Velocities substantially above or below this particular range result in a departure from the desired conversion levels and hence cause a decrease in yield of water-soluble chemicals.

Figure 3:
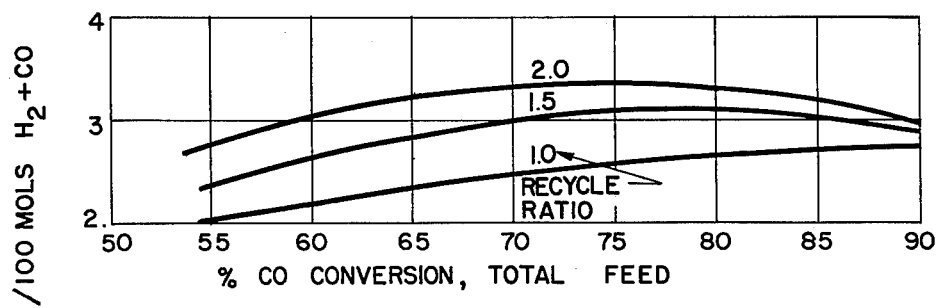
Fig. 3 illustrates the relationship of water-soluble chemicals product and total feed carbon monoxide conversion at recycle ratios of 1.0, 1.5, and 2.0.

Fig. 3 illustrates the yield of water-soluble chemicals in terms of atoms of carbon per 100 moles of H₂+CO at recycle ratios of 1.0, 1.5, and 2.0 and again indicates that maximum yields of water-soluble chemicals can be obtained in the total feed carbon monoxide conversion level of 70 to 80 per cent. These data were secured at 650° F. and at 400 p. s. i. pressure, utilizing a fresh feed having a H₂:CO ratio of 1.85.

From the curves it will be noted that at recycle ratios of from 1.5 to 2.0 the optimum yields of water-soluble chemicals vary with the total feed carbon monoxide conversion level. Also, the desired broad range of total feed carbon monoxide conversion at a given recycle ratio is slightly different. Thus, at a recycle ratio of 1.5 the carbon monoxide conversion may vary from about 70 to about 83 per cent, while with a recycle ratio of 2 conversions of from about 70 to 80 per cent should be achieved.

Fig. 4 shows the effect of pressure on yield of water-soluble chemicals at temperatures of from 650 to 660° F., total feed carbon monoxide conversion of 75 per cent, and a recycle ratio of 1.8 with a fresh feed having H₂:CO ratio of 1.9 to 2.0. It will be seen from the graph that very little, if any, increase in water-soluble chemicals yield is achieved at pressures above 360 to 400 p. s. i. and that the yield of chemicals drops off rapidly at pressures much below 275 to 300 p. s. i.

In Fig. 5 the effect of H₂:CO ratio in the fresh feed on water-soluble chemicals yield is shown under the following conditions: 1.8 recycle ratio; pressure of 400 p. s. i.; temperature 650° F., and a total feed carbon monoxide conversion of 75 per cent. From the curves presented it is apparent that maximum yields of water-soluble chemicals can be secured at fresh feed H₂:CO ratios of from about 1.8 to about 2.0.

From the foregoing description, as well as from the graphs presented, it will be seen that an extremely close relationship exists between the combination of relatively narrow operating conditions taught herein and the conversion of carbon monoxide maximum yields of water-soluble chemicals in the synthesis of hydrocarbons by the reduction of carbon monoxide with hydrogen in the presence of a fluidized catalyst. Moreover, it has been demonstrated that a departure from the recommended range of any single set of operating conditions, i. e., pressure, recycle ratio, per cent total feed carbon monoxide, etc., causes a substantial reduction in the ultimate yield of water-soluble chemicals. In addition, I have shown for the first time the important relationship existing between per cent total feed carbon monoxide conversion and selectivity to water-soluble chemicals.

I claim:

1. In a process for the synthesis of hydrocarbons and chemicals by passing a mixture of carbon monoxide and hydrogen into a reaction zone containing a finely divided iron catalyst to obtain increased yields of water-soluble chemicals, the steps which comprise effecting said reaction at a total feed carbon monoxide conversion of between about 70 and about 83 per cent by contacting said catalyst with a fresh feed gas containing major proportions of hydrogen and carbon monoxide in a ratio ranging from about 1.5 to about 2.0 at a temperature of from about 600 to about 670° F. and at a pressure of from about 275 to about 400 p. s. i. to produce gaseous and normally liquid hydrocarbons and oxygenated organic compounds, withdrawing from said reaction zone an effluent comprising gaseous and normally liquid hydrocarbons, water-soluble organic chemicals, carbon dioxide, carbon monoxide, and hydrogen, separating said water-soluble organic chemicals and the normally gaseous constituents from said effluent, and recycling a sufficient quantity of said normally gaseous constituents to said reaction zone to maintain in the total feed to said zone from about 1.2 to 2.0 volumes of recycle gas per volume of fresh feed.

2. The process of claim 1 in which the reaction is effected at a total feed carbon monoxide conversion of from about 75 to about 78 per cent.

3. The process of claim 1 in which iron mill scale is employed as the catalyst.

4. In a process for the synthesis of hydrocarbons and chemicals by passing a mixture of carbon monoxide and hydrogen into a reaction zone containing a finely divided iron catalyst to obtain increased yields of water-soluble chemicals, the steps which comprise effecting said reaction at a total feed carbon monoxide conversion of between about 70 and about 83 per cent by contacting said catalyst with a fresh feed gas containing major proportions of hydrogen and carbon monoxide in a ratio ranging from about 1.5 to about 2.0 at a temperature of from about 600 to about 670° F. and at a pressure of from about 275 to about 400 p. s. i. to produce gaseous and normally liquid hydrocarbons and oxygenated organic compounds, withdrawing from said reaction zone an effluent comprising gaseous and normally liquid hydrocarbons, carbon dioxide, carbon monoxide, and hydrogen, separating the normally gaseous constituents, and recycling a sufficient quantity of said normally gaseous constituents to said reaction zone to maintain in the total feed to said zone from about 1.2 to 2.0 volumes of recycle gas per volume of fresh feed.

5. The process of claim 1 in which the effluent gases from the reaction zone not consumed as recycle gas are introduced into a second reaction zone, contacting said unconsumed effluent gases containing carbon monoxide and hydrogen with a finely divided iron catalyst and effecting a conversion of carbon monoxide in said unconsumed gases at a temperature of from about 600 to 670° F. and at a pressure of from about 275 to about 400 p. s. i., said conversion being conducted in a manner such that the overall carbon monoxide conversion, based on the total feed to the first reaction zone, is of the order of 90 to 95 per cent.

6. The process of claim 1 in which the effluent gases from the reaction zone not consumed as recycle gas are mixed with a sufficient quantity of a gaseous mixture containing a major proportion of hydrogen and carbon monoxide to yield a final feed mixture containing hydrogen and carbon monoxide in a ratio ranging from about 1.5:1 to about 2.0:1, introducing said mixture into a second reaction zone and contacting the former with a finely divided iron catalyst, conducting the reaction at a total feed carbon monoxide conversion level of from about 90 to about 95 per cent at a temperature of from about 600 to 670° F. and at a pressure of from 325 to 425 p. s. i., withdrawing from said second reaction zone an effluent comprising gaseous and normally liquid hydrocarbons, carbon dioxide, carbon monoxide, and hydrogen, separating the normally gaseous constituents of said effluent from the normally liquid components thereof, and recycling a sufficient quantity of said normally gaseous constituents to said second reaction zone to maintain in the total feed to said zone from about 1.2 to about 2.0 volumes of recycle gas per volume of fresh feed to said second reaction zone.

7. The process of claim 1 in which the catalyst consists essentially of alkali-promoted mill scale.

8. The process of claim 1 in which the following operating conditions are established: mill scale catalyst promoted with an alkali-promoted metal compound; temperatures of from about 600 to 670° F.; pressures of from about 340 to about 360 p. s. i.; $H_2$:CO ratio in fresh feed 1.7 to about 1.9; recycle ratio of about 1.5.

References Cited in the file of this patent

UNITED STATES PATENTS

| Number | Name | Date |
|---|---|---|
| 2,360,787 | Murphree et al. | Oct. 17, 1944 |
| 2,417,164 | Huber, Jr. | Mar. 11, 1947 |
| 2,485,945 | Walker | Oct. 25, 1949 |
| 2,527,846 | Phinney et al. | Oct. 31, 1950 |
| 2,534,853 | Carkeek | Dec. 19, 1950 |
| 2,540,581 | Hemminger | Feb. 6, 1951 |
| 2,560,344 | Hemminger | July 10, 1951 |